United States Patent
Shang et al.

(10) Patent No.: US 7,599,398 B1
(45) Date of Patent: Oct. 6, 2009

(54) METHOD AND APPARATUS FOR DYNAMICALLY ADJUSTING SYSTEM TIMERS IN WIRELESS NETWORKS TO OPTIMIZE CONNECTION PERFORMANCE

(75) Inventors: Ching-Fang Shang, Fremont, CA (US); Pak-Chiu Leung, Saratoga, CA (US); Charles Okwudiafor, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 818 days.

(21) Appl. No.: 10/883,550

(22) Filed: Jul. 1, 2004

(51) Int. Cl.
*H04J 3/06* (2006.01)
(52) U.S. Cl. .................................... 370/503
(58) Field of Classification Search ............ None
See application file for complete search history.

(56) References Cited

U.S. PATENT DOCUMENTS

| | | | |
|---|---|---|---|
| 6,246,376 B1 * | 6/2001 | Bork et al. ............... | 343/760 |
| 6,304,556 B1 * | 10/2001 | Haas ....................... | 370/254 |
| 6,389,291 B1 | 5/2002 | Pande et al. | |
| 6,452,541 B1 * | 9/2002 | Zhao et al. ............... | 370/519 |
| 6,483,856 B1 * | 11/2002 | Bird ....................... | 370/503 |
| 6,622,022 B1 * | 9/2003 | Du ......................... | 370/356 |
| 6,744,740 B2 * | 6/2004 | Chen ....................... | 370/255 |
| 7,006,534 B1 * | 2/2006 | Nemoto .................... | 370/508 |
| 7,031,329 B2 * | 4/2006 | Lipsanen .................. | 370/408 |
| 7,072,432 B2 * | 7/2006 | Belcea ..................... | 370/503 |
| 7,295,533 B2 * | 11/2007 | Alicherry et al. .......... | 370/328 |
| 2002/0167934 A1 * | 11/2002 | Carter et al. .............. | 370/350 |
| 2003/0058834 A1 * | 3/2003 | Soulie et al. .............. | 370/350 |
| 2004/0183674 A1 * | 9/2004 | Ruvarac .................. | 340/539.13 |
| 2005/0053099 A1 * | 3/2005 | Spear et al. ............... | 370/508 |
| 2005/0175038 A1 * | 8/2005 | Carlson et al. ............ | 370/503 |
| 2005/0195761 A1 * | 9/2005 | Alicherry et al. .......... | 370/328 |

* cited by examiner

*Primary Examiner*—Anh-Vu H Ly
(74) *Attorney, Agent, or Firm*—Trellis IP Law Group, PC

(57) ABSTRACT

A root node sets wireless network timer values by using dynamic location information of a plurality of non-root nodes. In an embodiment, the root node and the non-root nodes are bridges, wherein the non-root bridges are connected to the root bridge in a point-to-point or point-to-multipoint manner. The locations of the nodes are determined by using a location system and locations receivers. The root node and each of the non-root nodes use this location information to determine the optimum timer values for the wireless network, thereby improving throughput on the wireless network. In one embodiment, the location system is the global positioning system (GPS). The location receiver is a GPS location receiver that is embedded in each of the nodes. In another embodiment, the GPS location receiver is external to the nodes, and the location information is determined remotely.

18 Claims, 5 Drawing Sheets

METHOD AND APPARATUS FOR DYNAMICALLY ADJUSTING SYSTEM TIMERS IN WIRELESS NETWORKS TO OPTIMIZE CONNECTION PERFORMANCE

BACKGROUND OF THE INVENTION

This invention relates in general to wireless networks and more specifically to the optimization of the performance of a wireless connection. It involves optimizing the configuration parameters for the wireless networks.

A wireless network comprises at least one root bridge (hereinafter referred to as root node), a plurality of non-root bridges (hereinafter referred to as non-root nodes) and a plurality of client devices. Each bridge (root and non-root) is designed to connect two or more networks, which are typically located in different buildings. The non-root node may either be static or mobile in nature, while the root node is static.

Nodes connect hard-to-wire sites, noncontiguous floors, satellite offices, school, or corporate campus settings, temporary networks, and warehouses, wherein both the root node and the non-root nodes are static, i.e., they are located at fixed pre-determined positions. Alternatively, the nodes can be deployed in a mobile environment such as a train station, wherein a root node can be installed at the station and a plurality of non-root nodes are installed in a plurality of trains. These non-root nodes are mobile in nature. Passenger notebooks/PDAs within the train connect to the wireless network through the mobile non-root nodes. Similarly, a root node can be installed in a police head quarter while the non-root nodes can be installed in each policeman patrol car. The client devices such as PDAs and notebooks connect to the non-root nodes. Further, the root bridge is configured as an access point for functional flexibility.

Communication between the non-root nodes in a wireless network is established over a radio (or infrared) link. Each non-root node is connected to zero or more client devices such as a PDA, laptop or cell-phone. The communication between the non-root nodes is enabled by the root nodes, which are strategically placed to cover the area over which the wireless connectivity is to be established. The root nodes are connected together and to an Ethernet, using copper or optical fiber cables.

The nodes communicate by sending a data frame and waiting for an acknowledgement frame to arrive from the receiving node. This mechanism for communication is required due to the unreliable nature of the wireless medium. In such a medium, the sending node has an internal timer or clock that is started whenever a frame is sent. If no acknowledgement is received within a specified time interval, the clock times out and the frame is sent again.

The details of the above-mentioned communication are described in a family of specifications, referred to as 802.11, developed by the Institute of Electrical and Electronics Engineers (IEEE). The specifications provide details of over-the-air interface between a non-root node and a root node, two non-root nodes, and a non-root node and a client device.

The 802.11 communication protocol requires a certain time gap between two frames being sent from a node. Similarly, a time gap is required between the last frame of one node and the first frame of the second node. These time gaps are used for transmission control on the wireless network. The time gap values are computed by the root node and communicated to the non-root nodes. The timer values that are set include Slot time, and Inter-Frame Space (IFS) parameters such as Distributed Inter Frame Space (DIFS), Point Coordination Inter Frame Space (PIFS), Short Inter Frame Space (SIFS), and Extended Inter Frame Space (EIFS). Each node has system timers that store the values of these time gaps and are set by using a distance parameter configuration.

The distance parameter configuration requires knowledge of the maximum deployment distance, i.e., the maximum distance within which a non-root node should be able to access the root node. For deployment in a static wireless network, the distance parameter is configured by using the longest distance to a non-root node within the static wireless network. In a mobile wireless network, the distance parameter is configured by using the maximum reachable distance from the root node. This maximum distance is limited by the strength of the radio signals. Since the location of each of the non-root nodes in a mobile wireless network changes, the distance parameter configuration determined at the deployment time is not optimal. Also, the farthest non-root node may not be positioned at the maximum reachable distance at all times. For most of the time, the non-root nodes would be at distances less than the maximum reachable distance. Consequently, a non-root node waits for a time period that is longer than necessary, while communicating. For example, if the longest reachable distance for a root node is 10 miles, using the methods existing in the art, the distance parameter would be set to 10 miles, and the timer values would be adjusted accordingly. However, most of the non-root nodes would, at any time, be at distances less than 10 miles, with the farthest non-root node being at, for example, 5 miles from the root node.

The methods known in the art do not have any provision for the dynamic adjustment of the distance related timer values. As a result, the throughput of the wireless network decreases, since nodes use unnecessarily large values for inter-frame spaces and other timers.

SUMMARY OF THE EMBODIMENTS OF THE INVENTION

In an embodiment, wireless network timer values are set by a root node by using dynamic location information of a plurality of non-root nodes. In an embodiment, the root node and the non-root nodes are bridges, wherein the non-root bridges are connected to the root bridge in a point-to-point or point-to-multipoint manner. The locations of the non-root nodes and the root node are determined by using a location system and locations receivers. The root node uses this location information to determine the optimum timer values for the wireless network, thereby improving throughput on the wireless network. In one embodiment, the location system is the global positioning system (GPS). The location receiver is a GPS location receiver that is embedded in each of the nodes. In another embodiment, the GPS location receiver is external to the nodes, and the location information is determined remotely.

In an embodiment, the invention provides a method for transmission control in a wireless network, the wireless network comprising at least one root node and a plurality of non-root nodes, the method comprising determining the location of each of the nodes; determining the distance of each of the non-root nodes from the root node based on the determined location of each of the non-root nodes and the root node; identifying the farthest non-root node based on the determined distance of the each of the non-root nodes from the root node; communicating the distance of the farthest non-root node to one or more non-root nodes; and setting a timer value used for transmission control based on the distance of the farthest non-root node from the root node.

In an embodiment, the invention provides a method for transmission control in a wireless network comprising a root node and a plurality of non-root nodes, the method comprising determining the location of each of the non-root nodes and the root node; determining the distance of each of the non-root nodes from the root node based on the determined location of each of the nodes; identifying the farthest non-root node based on the determined distance of the each of the non-root nodes from the root node; setting a timer value used for transmission control based on the distance of the farthest non-root node from the root node; and communicating the set timer value to each of the non-root nodes.

In another embodiment, the invention provides a method for setting a timer value in a wireless network, the wireless network comprising at least one root node and a plurality of non-root nodes, the timer value being used for controlling transmission between the root node and each of the non-root nodes, the method comprising determining the location of each of the non-root nodes and the root node; determining the distance of each of the non-root nodes from the root node based on the determined location of each of the non-root nodes; identifying the farthest non-root node based on the determined distance of the each of the non-root nodes from the root node; and setting a timer value used for transmission control based on the distance of the farthest non-root node from the root node.

In another embodiment, the invention provides a method for optimizing connection performance in a wireless network, the wireless network comprising a plurality of nodes, the method comprising determining the location of each node using the global positioning system; determining the distance between a pair of nodes; and setting a timer value used for transmission control on the connection between the pair of nodes, the timer being set based on the determined distance.

In another embodiment, the invention provides a wireless network comprising a plurality of non-root nodes; a location system for determining the location of each of the non-root nodes and the root node; and a root node capable of setting a timer value used for transmission control based on the location of the farthest non-root node from the root node.

In another embodiment, the invention provides an apparatus for enabling communication on a wireless network, the wireless network comprising a plurality of non-root nodes and a location system, the location system determining the location of each of the plurality of non-root nodes and the root node, the apparatus comprising a location receiving module for receiving the location of each of the nodes from the location system; a distance calculation module for calculating the distance of each of the non-root nodes from the root node based on the determined location of each of the non-root nodes; a distance comparison module for identifying the farthest non-root node based on the determined distance of the each of the non-root nodes; a timer setting module for setting a timer value used for transmission control based on the distance of the farthest non-root node from the root node; and a communication module for communicating the distance of the farthest non-root node or the set timer value to one or more non-root nodes.

DETAILED DESCRIPTION OF THE EMBODIMENTS OF THE INVENTION

Figure 1:
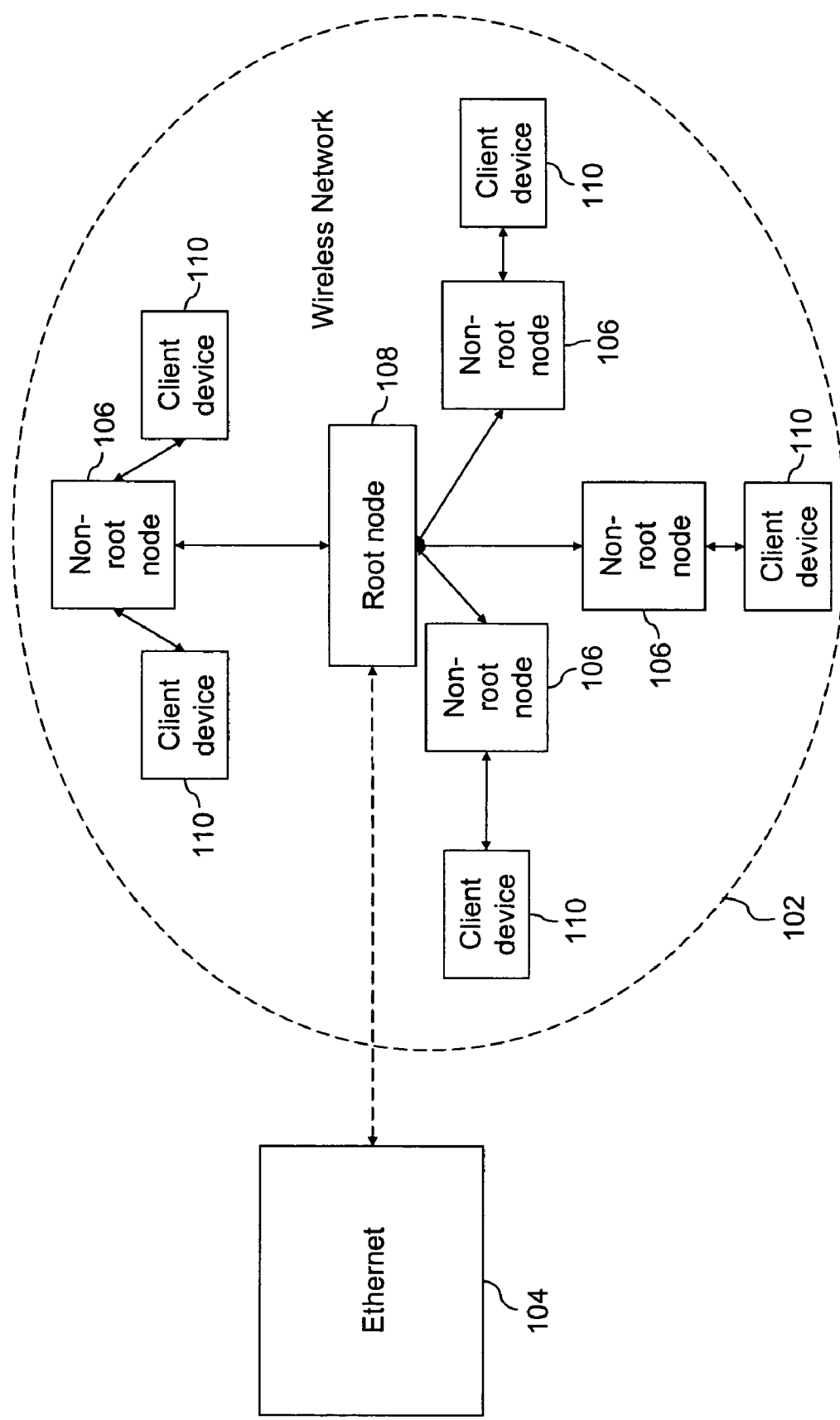
FIG. 1 illustrates a basic network suitable for use with the present invention.

FIG. 1 illustrates a basic network suitable for use with the present invention.

FIG. 1 illustrates a wireless network 102 connected to an Ethernet 104. Wireless network 102 comprises a plurality of non-root nodes 106, a root node 108, and a plurality of client devices 110. Ethernet 104 can be a network such as the Internet, a corporate or campus intranet, local area network (LAN), wide-area network (WAN) or a home or small network. Each non-root node 106 is connected to root node 108 through a wireless link. Zero or more client devices 110 are connected to each of non-root nodes 106. Root node 108 is connected to Ethernet 104 through a wired link. In an embodiment of the present invention, the wireless link is either a radio or an infrared link. In an embodiment of the present invention, the wired link is either a copper cable or an optical fiber cable. In an embodiment, non-root nodes 106 are bridges, which connect to root bridge 108 in a point-to-point or point-to-multipoint manner. Non-root nodes 106 may be mobile or static. In an embodiment, non-root nodes 106 are mobile. In another embodiment, non-root nodes 106 are static and provide wireless connectivity to the plurality of client devices 110 within a defined area. The communication between non-root nodes 106 can be either in infrastructure mode or an ad hoc mode. In the infrastructure mode of communication, root node 108 acts as a bridge that enables connectivity of non-root nodes 106 to Ethernet 104. In the ad hoc mode, non-root nodes 106 communicate with each other in a peer-to-peer fashion. In an embodiment, client devices 110 can be computers capable of wireless connection. Alternatively, client devices can be hand-held devices such as PDAs, cellular phones or other computing devices such as laptops.

In an embodiment of the present invention, wireless network 102 is based on the IEEE specifications for wireless LANs known as 802.11. The 802.11 specifications include the definition of the MAC layer of a wireless network. The MAC layer defines various timer values that are essential for transmission control over a wireless network. For example, a timer value Distributed Inter Frame Space (DIFS) is defined to indicate the period during which the wireless medium is free.

Figure 2:
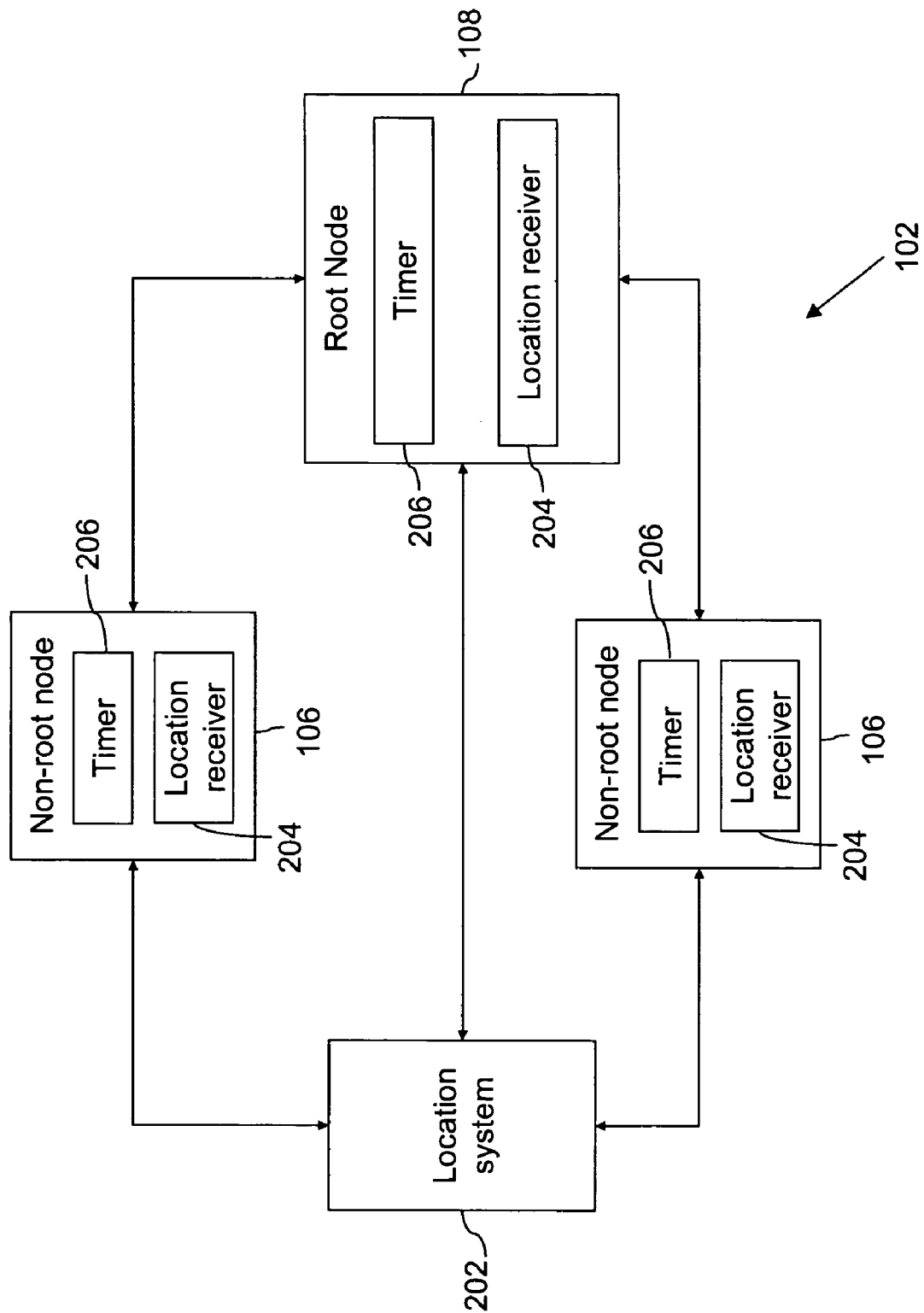
FIG. 2 illustrates a wireless network in an exemplary embodiment of the present invention.

FIG. 2 illustrates a wireless network in an exemplary embodiment of the present invention.

In FIG. 2, wireless network 102 comprises non-root nodes 106, root node 108, and a location system 202. Each of non-root nodes 106 and root node 108 include a location receiver 204 and a timer 206 for transmission control. In an embodiment of the present invention, location system 202 is the global positioning system (GPS), and location receiver 204 is a GPS receiver. Location system 202 locates the position of root node 108 and non-root node 106 and provides this information to location receiver 204, to transmit the location of non-root node 106 to root node 108. Root node 108 also receives its location from location system 202 through location receiver 204.

In an embodiment of the present invention, location receiver 204 is embedded within each of the nodes. Alternatively, location receiver 204 can be physically separated from the nodes. For example, GPS receivers such as those manufactured by Trimble® Navigation Limited can be included within the nodes.

The location of each of non-root nodes 106 and root node 108 is used to determine the location of the non-root node that is farthest from root node 108. The distance of the farthest non-root node from root node 108 is used to set timer 206. Timer 206 stores several Inter Frame Space time values that are used for transmission control on wireless network 102. For example, timer value can be value of Short Inter Frame Space, that is the time gap between separate transmissions belonging to a single dialog between a pair of nodes. Other examples for timer value include value of Point Coordination Inter Frame Space, Distributed Inter Frame Space, and Slot time for transmission control. These timer values are defined in accordance with the 802.11 family of specifications, and their definition will be apparent to a person skilled in the art.

In an embodiment of the present invention, the location of each of client devices 110 connected to non-root node 106 is used to determine the client device that is farthest from non-root node 106. The distance of the farthest client device is used to set a timer used for communication between non-root node 106 and the plurality of client devices 110.

While the invention has been described using GPS-based location system 202, it will be apparent to a person skilled in the art that an alternate location system can also be used. For example, protocols based on Bluetooth specifications can be used to determine the locations of non-root nodes 106 within a small range. Alternatively, systems such as a cellular phone network, a triangulation of radio frequency, an infrared, sonic, ultrasonic or other signals can be used with at least one root node of known location, to determine the location of each of the non-root nodes 106. The decision regarding the location system to be used depends on the location resolution required.

Root node 108 receives location information from location receivers 204 either automatically or manually. Further, location receiver 204 can reside on a separate device such as an automobile, handheld GPS transceiver, etc. Other approaches are possible. Note that although specific characteristics of location systems have been discussed, embodiments of the present invention may work equally well with variations on such systems, or with other types of location-determining systems.

Figure 3:
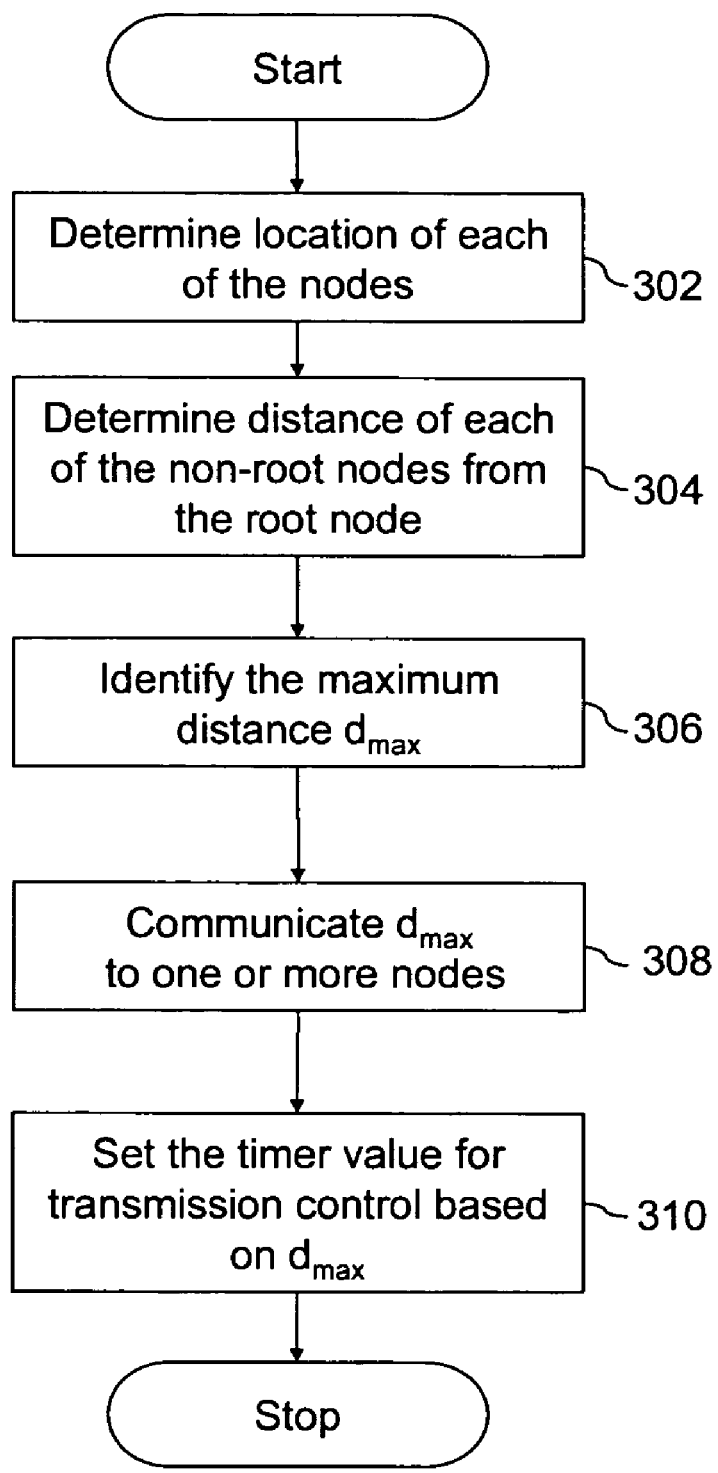
FIG. 3 is a flowchart illustrating a method for transmission control in a wireless network.

FIG. 3 is a flowchart illustrating a method for transmission control in wireless network 102.

In step 302, the location of each of non-root nodes 106 and root node 108 is determined by using location system 202 and location receivers 204. The locations of non-root nodes 106 are determined in a sequential manner. Any sequence may be chosen to iterate over the set of non-root nodes 106. The only requirement for the sequence is that it must be exhaustive and cover the list of non-root nodes 106. In an embodiment, step 302 is periodically triggered off by root node 108. In another embodiment, step 302 is performed when at least one of non-root nodes 106 indicates to root node 108 that its location has changed.

In step 304, the distance between each non-root node 106 and root node 108 is determined. The distance between root node 108 and each non-root node 106 can be determined if their absolute locations are known. In step 306, the maximum distance, $d_{max}$ amongst the distances determined in step 304, is identified. Subsequently, in step 308, the maximum distance $d_{max}$ is communicated to one or more non-root nodes 106. In step 310, each of these non-root nodes 106 sets the timer values based on $d_{max}$. This ensures that the transmission control is uniform for all transmissions from all non-root nodes 106. In an embodiment of the present invention, $d_{max}$ can be communicated by using the Information Element in the periodic beacon from root node 108. The structure of the 802.11 beacon frame is well known in the art and will be apparent to a person skilled in the art.

In an embodiment, alternative to step 308, timer values in timer 206 are set by root node 108, based on $d_{max}$. In this embodiment, alternative to step 310, the set timer values are communicated to one or more non-root nodes 106. Thus, in different embodiments, the timer value may be set by root node 108 and communicated to each of the non-root nodes 106 or the timer value may be set by each of the non-root nodes based on the communicated $d_{max}$.

The location information of non-root nodes 106 is communicated to root node 108 as a frame of IP Layer or Data Link Layer. For example, the management frame sent as an association request at the time of data link establishment can be used to carry non-root node location information. Transaction oriented request/reply protocol Cisco Wireless LAN Context Control Protocol (WLCCP), used to manage the operational context of mobile 802.11 nodes, can be used to synchronize non-root node location information between root node 108 and non-root nodes 106. New WLCCP sub types can be defined to provide location information changes to root node 108.

The distance parameter is configured based on the distance of the farthest non-root node. In an embodiment, for an 802.11 wireless network, the timer values are determined using the following formulae. For example, slot time may be calculated as SlotTime+x*(Distance*y). PIFS may be calculated using the formula PIFSTime=(SIFSTime+SlotTime+z)+x*(Distance*y). Further DIFS may be calculated using the formula DIFSTime=(SIFSTime+x*SlotTime−z)+x*(Distance*y). In these formulas, appropriate values for variables 'x', 'y' and 'z' may be defined to suit to the network.

The above-described method for adjusting timer values can be used to optimize the connection performance in a wireless network such as in an ad-hoc mode. This method is described in conjunction with FIG. 4.

Figure 4:
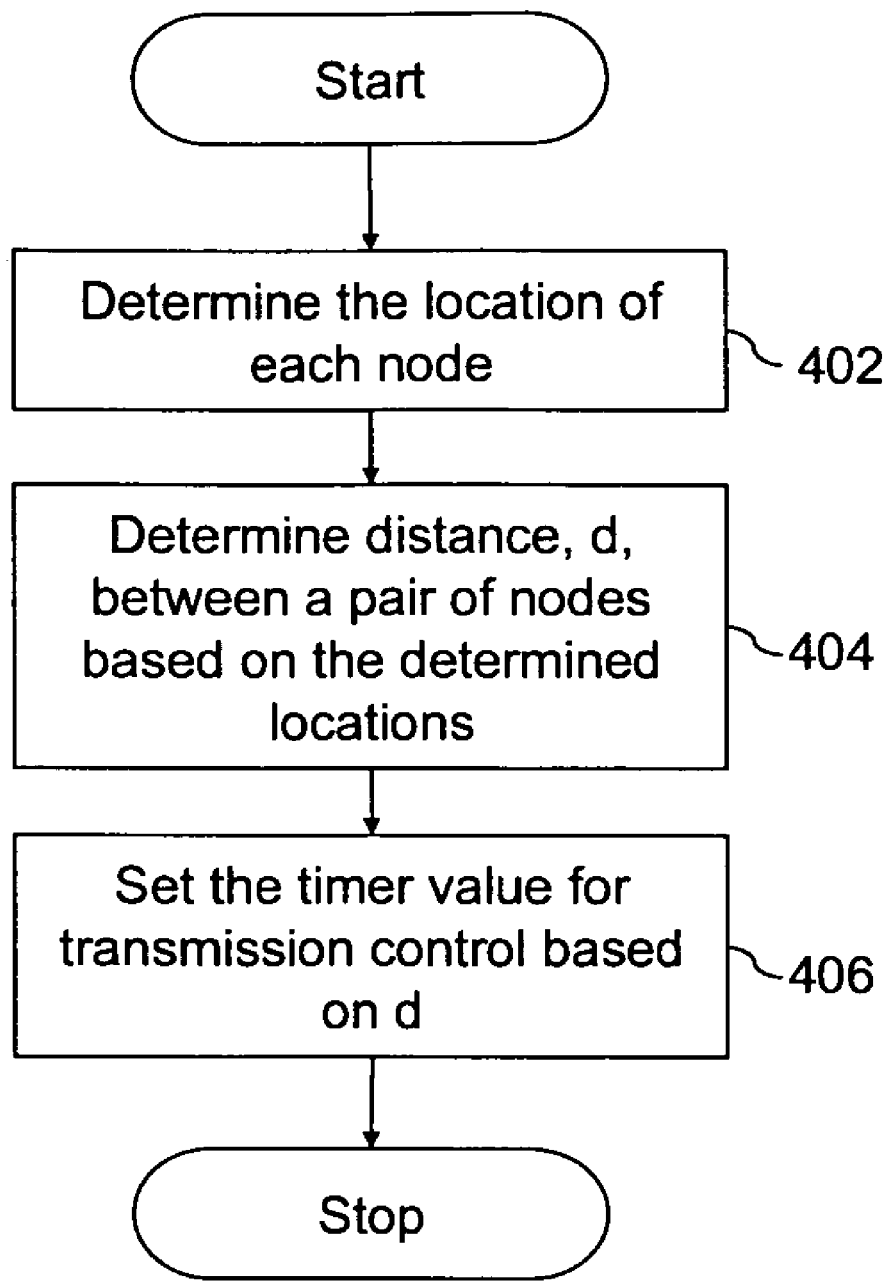
FIG. 4 is a flowchart illustrating a method for optimizing connection performance in a wireless network using ad-hoc mode of communication.

FIG. 4 is a flowchart illustrating a method for optimizing the connection performance in a wireless network using the ad-hoc mode of communication.

In step 402, the location of each of a pair of non-root nodes 106, that are communicating with each other, is determined by using the global positioning system. In step 404, the distance between the two nodes is determined. In step 406, the timer value used for transmission control is set based on the distance between the two nodes. Setting the timer value based on actual distance leads to the optimization of the wireless connection. For example, non-root nodes 106 may be capable of communicating on a radio link at distances 10 miles apart. If the actual distance between the pair of non-root nodes 106 is 100 m, timer value based on the latter leads to a greater network throughput.

Figure 5:
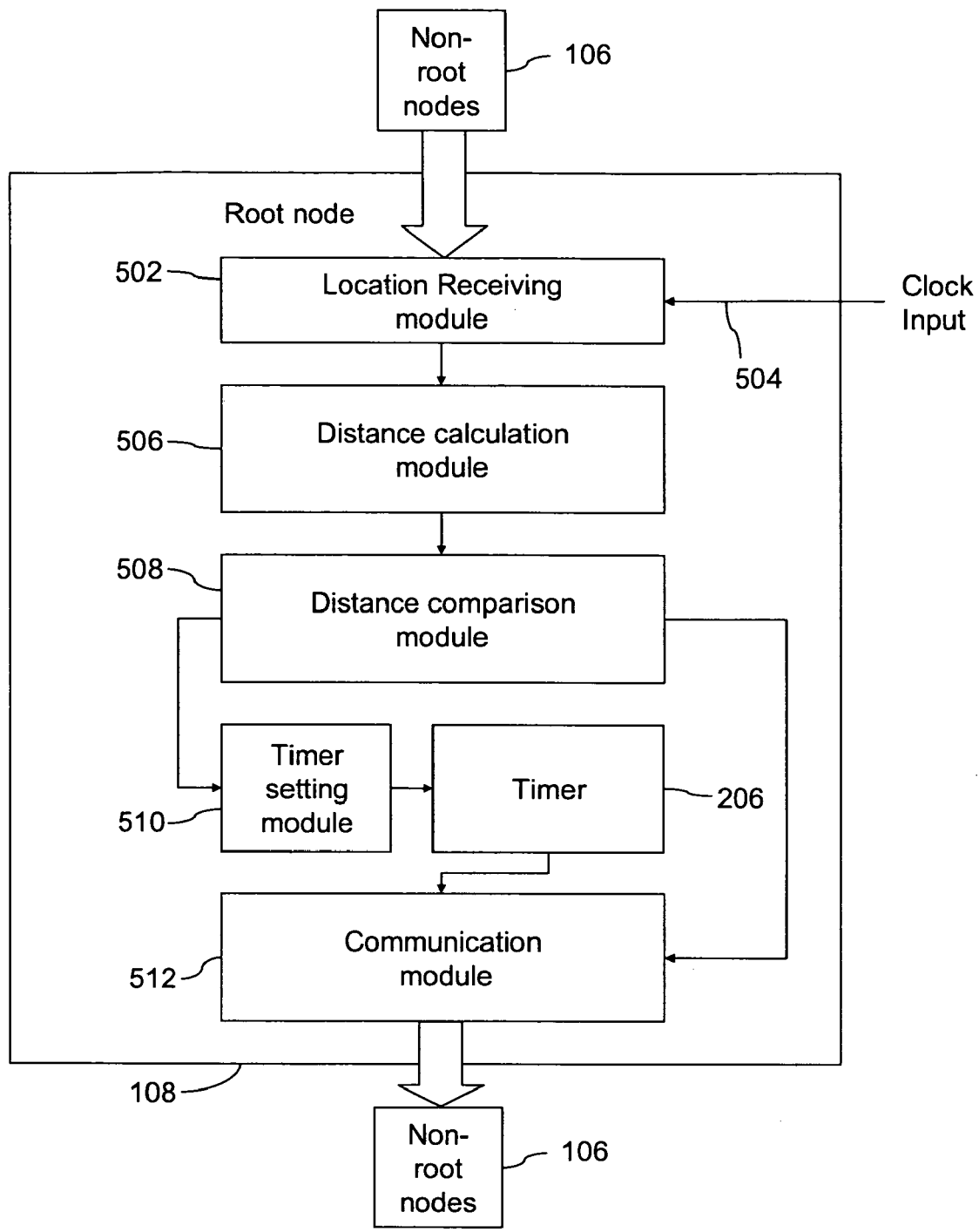
FIG. 5 illustrates a block diagram of a root node in an embodiment of the present invention.

FIG. 5 illustrates a block diagram of root node 108 in an embodiment of the present invention.

Root node 108 comprises a location receiving module 502, a clock input 504 to location receiving module 504, a distance calculation module 506, a distance comparison module 508, a timer setting module 510, a communication module 512 and a timer 206 used for transmission control. Location receiving module 502 receives the location information from non-root nodes 106. Location receiving module 502 interfaces with non-root nodes 106 and collects location information. In one embodiment, location receiving module 502 is a 2.4 GHz radio receiver with associated firmware circuitry for reading a frame field containing the location information. For example, 2.4 GHz radio transceivers developed by Toshiba, Inc. can be used for the above-mentioned purpose. Other manufacturers such as Marvel Technology Group Ltd., California, US, also develop radio receivers. Such a radio receiver can be connected to a processor by a bus communication connector such as a MiniPCI Connector. The program instructions for identifying the location information field in the data frame can be stored in a flash memory on the location receiving module chip, the flash memory being connected to the processor. The location information can itself be stored in a SDRAM connected to the processor by a data bus.

As an example of Protocol Data Unit (PDU) format suitable for use with the present invention, an 802.11 compatible packet format may be used. 802.11 headers corresponding to Frame Control, Duration, Address Fields and Sequence Control may be used. The payload portion of the packet may include Element Information for management frames, headers of higher layers such as IP layer, and distance information. The distance information may comprise latitude, longitude and altitude information associated with a location.

Location receiving module 502 receives a clock input 504. Clock input 504 triggers the non-root node location information receiving mechanism. In one embodiment, on receiving a pulse from clock input 504, root node 108 sends a frame asking non-root nodes 106 to send their location information to root node 108. For example, clock input 504 may be spaced 5 seconds apart. Therefore, root node 108 sends a data frame to non-root nodes 106 every 5 seconds seeking their location information. In another embodiment, at least one non-root node 106 can asynchronously indicate to root node 108 that its location has changed. For example, non-root node 106 can send a location-change-information frame to root node 108 indicating that its location has changed. In response to the location-change-information frame, root node 108 sends a frame asking each of the non-root nodes 106 for their location information. Subsequently, a frame containing the actual location information is sent by non-root nodes 106. In another embodiment, non-root nodes 106 can periodically, for example, every 5 seconds, report their location information to root node 108.

Location receiving module 502 transfers the location information of the nodes to distance calculation module 506. In an embodiment, distance calculation module 506 contains a processor, and an associated firmware circuitry storing program instructions for calculating the distance between two nodes, i.e., either between a non-root node 106 and root node 108 or between a pair of non-root nodes 106, given their location. In an embodiment, distance calculation module 506 can be a firmware chip with a processor attached to a flash memory containing the program instructions that compute the distance between the two nodes when their positional co-ordinates or latitude and longitude values are known. In another embodiment, distance calculation module 506 can be a software program that computes the distance as described above and resides in a storage device attached to root node 108.

Distance calculation module 506 transfers the calculated distances to distance comparison module 508. Distance comparison module 508 stores the distance information for each of non-root nodes 106 and compares these distances to identify the largest distance. In an embodiment of the present invention, distance comparison module 508 is a chip that comprises a processor, a storage device to store the distances of all non-root nodes, and a flash memory to store program instructions that fetch distance values from the storage device. The flash memory further comprises program instructions to compare pairs of distance values and store the higher distance value for further comparison. This comparison of pairs is repeated over the entire set of non-root node distances to identify the largest distance value. In another embodiment, distance comparison module 508 is a software program that calculates the largest distance value in the way described above, the program and the set of distance values being stored in a storage device attached to root node 108.

Distance comparison module 508 transfers the maximum determined distance to timer setting module 510, which determines the timer values. The determined timer values are then stored in timer 206. In an embodiment of the present invention, timer setting module 510 is a chip that comprises a processor, a register to store the distance of the farthest non-root node, and a flash memory to store program instructions to calculate the timer value from the distance of the farthest non-root node. In another embodiment, time setting module 510 is a software program calculating the timer value from the identified largest distance in the way described above, the program and the distance value being stored in a storage device attached to root node 108. The steps for calculating the timer value once the distance is determined is known in the art and will be apparent to a person skilled in the art. In an embodiment, timer 206 is a storage device that stores the timer value. Timer value is used for transmission control on the wireless network. For example, Cisco wireless bridges have a distance parameter configuration which can be customized and timer values such as Slot Time, Distributed Inter Frame Space and Point Coordinated Inter Frame Space are set based on the distance-time relationship stored in the circuitry of the wireless bridge.

In an embodiment, communication module 512 communicates the value of $d_{max}$ to one or more non-root nodes 106. Non-root nodes 106 set their timers based on $d_{max}$ according to the aforementioned formulae. In another embodiment, communication module 512 communicates the set timer values to each non-root node 106 so that transmission on wireless network 102 is controlled by using the consistent timer values. In an embodiment, this module is a 2.4 GHz radio transmitter with an attached processor and a storage device. The storage device stores the timer or distance values received from timer 206 or distance comparison module 508. The processor transfers the stored timer or distance values to the radio transmitter. The radio transmitter transmits the timer or distance values to non-root nodes 106 by using existing data frame such as a periodic beacon frame. For example, 2.4 GHz radio transceivers developed by Toshiba, Inc. can be used for the above-mentioned purpose. Other manufacturers such as Marvel Technology Group Ltd., California, U.S., also develop radio transmitters.

Although the invention has been discussed with respect to the specific embodiments thereof, these embodiments are merely illustrative, and not restrictive, of the invention. For example, a "location receiving module" can have a processor, flash memory for storing program instructions and a memory for storing location information, exclusive to itself, or these can be shared with other modules. In the former case, a data bus would be connecting the different modules while in the latter the transfer of information by one module to the other just involves one module indicating to the other that new data is available in the shared memory. Further, the program instructions can reside on a flash memory in the form of processor instructions and an associated processor for executing the instructions, or can be stored in software coded in a high-level language and executed through virtual machine software.

Although specific protocols have been used to describe embodiments, other embodiments can use other transmission protocols or standards. The use of the terms "peer," "non-root node" and "root node" can include any type of device, operation or other process. The present invention can operate between any two entities including users, devices, functional systems or combinations of hardware and software. Peer-to-peer wireless networks and any other networks or systems where the non-root nodes communicate by themselves and root nodes are not even present are within the scope of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of the embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all its embodiments. Therefore, the respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer; application specific integrated circuits; programmable logic devices; field programmable gate arrays; optical, chemical, biological, quantum or nanoengineered systems, components and mechanisms may also be used. In general, the functions of the present invention can be achieved by any means as is known in the art. Distributed, or networked systems, components and circuits can also be used. The communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention and are to be included within the spirit and scope of the present invention.

Therefore, while the present invention has been described herein with reference to the particular embodiments thereof, a latitude of modification, various changes and substitutions are intended in the foregoing disclosures, and it will be appreciated that in some instances some features of the embodiments of the invention will be employed without the corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for transmission control in a wireless network, the wireless network comprising at least one root node and a plurality of non-root nodes, the method comprising:
   determining a location of each of the nodes;
   determining, by the root node, a distance of each of the non-root nodes from the root node based on the determined location of each of the non-root nodes and the root node;
   identifying, by the root node, a farthest non-root node based on the determined distance of each of the non-root nodes from the root-node;
   communicating, by the root node, a distance of the farthest non-root node to one or more non-root nodes;
   setting a timer value, by the root node, used for transmission control based on the distance of the farthest non-root node from the root node; and
   communicating, by the root node, the set timer value to one or more non-root nodes.

2. The method of claim 1, wherein the determination of the location of each of the non-root nodes is periodically triggered off by the root node.

3. The method of claim 1, wherein the determination of the location of each of the non-root nodes is triggered off when a non-root node communicates to the root node that there is a change in its location.

4. The method of claim 1, wherein the location of each of the non-root nodes is determined by using a global positioning system.

5. The method of claim 1, wherein the location of each of the non-root nodes is communicated to the root node by using a management frame.

6. The method of claim 5, wherein the management frame is an association request frame.

7. The method of claim 1, wherein the distance of the farthest non-root node is communicated to one or more non-root nodes by using a periodic beacon frame.

8. A wireless network, comprising:
   a plurality of non-root nodes;
   a location system for determining a location of each of the non-root nodes; and
   a root node configured to set a timer value used for transmission control based on a location of a farthest non-root node from the root node, the root node comprising:
      a timer configured to store the time value used for transmission control on the wireless network;
      a location receiving module configured to receive the location of each of the non-root nodes from the location system;
      a distance calculation module configured to calculate a distance from each of the non-root nodes based on the determined location of each of the non-root nodes and the root node;
      a distance comparison module configured to identify a farthest non-root node based on the determined distance of each of the non-root nodes from the root-node;
      a timer setting module configured to set the time value used for transmission control based on the distance of the farthest non-root node from the root-node; and
      a communication module configured to communicate the distance of the farthest non-root node and the set timer value to each of the non-root nodes.

9. The wireless network of claim 8, wherein the location system comprises a global positioning system.

10. The wireless network of claim 8, wherein each of the nodes comprises a location receiver configured to receive node location information from the location system.

11. An apparatus for enabling communication on a wireless network, the wireless network comprising a plurality of non-root nodes and a location system, the location system determining location information for each of the plurality of non-root nodes, the apparatus comprising:
    means for storing a timer value used for transmission control on the wireless network;
    means for receiving a location of each of the non-root nodes from the location system;
    means for calculating a distance from each of the non-root nodes based on the determined location of each of the non-root nodes from a root node;
    means for identifying a farthest non-root node based on the determined distance of each of the non-root nodes from the root-node;
    means for setting the timer value used for transmission control based on the distance of the farthest non-root node from the root node; and
    means for communicating a distance of the farthest non-root node and the set timer value to one or more non-root nodes.

12. The apparatus of claim 11, further comprising means for triggering periodic determination of the location of each of non-root nodes.

13. An apparatus for setting a timer value in a wireless network, the wireless network comprising at least one root node and a plurality of non-root nodes, the timer value being used for transmission control on the wireless network, the apparatus comprising:
    a processor; and
    a computer-readable storage medium including computer instructions executable by the processor, the computer-readable storage medium comprising:
       one or more instructions for determining a location of each of the non-root nodes;
       one or more instructions for determining a distance of each of the non-root nodes from the root node based on the determined location of each of the non-root nodes from the root node;
       one or more instructions for identifying a farthest non-root node based on the determined distance of each of the non-root nodes from the root-node;
       one or more instructions for communicating a distance of the farthest non-root node to one or more non-root nodes;
       one or more instructions for setting a timer value used for transmission control based on the distance of the farthest non-root node from the root node; and
       one or more instructions for communicating the set timer value to one or more non-root nodes.

14. A computer-readable storage medium including computer executable instructions to be executed by a computer, the storage medium comprising:
    one or more instructions for determining locations of a plurality of non-root nodes and a root node in a wireless network;
    one or more instructions for determining, by the root node, a distance of each of the non-root nodes from the root node on the wireless network based on the determined location of each of the non-root nodes;
    one or more instructions for identifying, by the root node, a farthest non-root node in the wireless network based on the determined distance of each of the non-root nodes;

one or more instructions for communicating, by the root node, a distance of the farthest non-root node to one or more non-root nodes;

one or more instructions for setting a timer value, by the root node, used for transmission control based on the distance of the farthest non-root node from the root node; and one or more instructions for communicating, by the root node, the set timer value to one or more non-root nodes.

15. The wireless network of claim 8, wherein the root node is configured to periodically trigger off the location determination of each of the non-root nodes.

16. The wireless network of claim 8, wherein each of the non-root nodes is configured to communicate a location to the root node using a management frame.

17. The wireless network of claim 16, wherein the management frame is an association request frame.

18. The wireless network of claim 8, wherein the communication module is configured to communicate the distance of the farthest non-root node using a periodic beacon frame.

* * * * *

UNITED STATES PATENT AND TRADEMARK OFFICE
CERTIFICATE OF CORRECTION

PATENT NO. : 7,599,398 B1 Page 1 of 1
APPLICATION NO. : 10/883550
DATED : October 6, 2009
INVENTOR(S) : Shang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Twenty-eighth Day of September, 2010

David J. Kappos
*Director of the United States Patent and Trademark Office*